United States Patent
Kaas

(10) Patent No.: US 7,431,847 B2
(45) Date of Patent: Oct. 7, 2008

(54) METHOD AND APPARATUS FOR PURIFYING WATER BY PHOTO-CHEMICAL OXIDATION

(76) Inventor: Povl Kaas, Th. Nlelsens Gade 11G, Herning (DK) DK-7400

( * ) Notice: Subject to any disclaimer, the term of this patent is extended or adjusted under 35 U.S.C. 154(b) by 409 days.

(21) Appl. No.: 10/535,657

(22) PCT Filed: Nov. 20, 2003

(86) PCT No.: PCT/DK03/00795

§ 371 (c)(1), (2), (4) Date: May 19, 2005

(87) PCT Pub. No.: WO2004/046038

PCT Pub. Date: Jun. 3, 2004

(65) Prior Publication Data
US 2006/0006117 A1    Jan. 12, 2006

(30) Foreign Application Priority Data
Nov. 20, 2002 (DK) ............... 2002 01796

(51) Int. Cl.
  *B01D 17/06*  (2006.01)
(52) U.S. Cl. .......... 210/748; 210/150; 250/436
(58) Field of Classification Search ......... 501/57; 210/748, 150; 250/436, 432
See application file for complete search history.

(56) References Cited

U.S. PATENT DOCUMENTS

| 4,454,512 A | * | 6/1984 | Millett ............ 342/125 |
|---|---|---|---|
| 4,792,407 A | | 12/1988 | Zeff et al. |
| 5,324,438 A | | 6/1994 | McPhee et al. |
| 5,348,665 A | | 9/1994 | Schulte et al. |
| 6,048,812 A | * | 4/2000 | Brocheton et al. ............ 501/57 |
| 6,447,721 B1 | | 9/2002 | Horton, III et al. |
| 6,451,209 B1 | | 9/2002 | Kaas |
| 2002/0023866 A1 | | 2/2002 | Barnes |
| 2004/0031762 A1 | | 2/2004 | Ried |

FOREIGN PATENT DOCUMENTS

| JP | 0409192659 | * | 7/1997 |
|---|---|---|---|
| WO | WO 97/29997 | | 8/1997 |
| WO | WO 99/33752 | | 7/1999 |
| WO | WO 03/022749 A1 | | 3/2003 |

\* cited by examiner

*Primary Examiner*—Walter D. Griffin
*Assistant Examiner*—Cameron J Allen
(74) *Attorney, Agent, or Firm*—Jacobson Holman PLLC

(57) ABSTRACT

An apparatus for purifying contaminated water by photo-chemical oxidation has at least a subflow of water that is directed through a flow channel in which the water is irradiated with UV electromagnetic radiation from at least one UV lamp assembly. The UV lamp assembly includes a high-pressure UV halogen lamp, which is mounted generally parallel with the flow direction in the channel. A method of irradiating the water flow with UV radiation includes using the at least one UV halogen high-pressure lamp assembly, which has energy intensive wave lengths in the range of 150 nm to 260 nm, preferably in the range of 160 nm to 220 nm, and most preferably in the range of 192 nm to 205 nm.

22 Claims, 3 Drawing Sheets

METHOD AND APPARATUS FOR PURIFYING WATER BY PHOTO-CHEMICAL OXIDATION

This is a nationalization of PCT/DK03/000795 filed Nov. 20, 2003 and published in English.

BACKGROUND OF THE INVENTION

1. Field of Invention

The present invention relates to an apparatus and a method for purifying contaminated water by photochemical oxidation, wherein at least a sub-flow of water is directed through a flow channel wherein the water is irradiated with UV electromagnetic radiation from at least one UV lamp assembly.

2. Description of the Prior Art

An apparatus and a method of such kind are known from WO 99/33752. Polluted or contaminated water is discharged in large quantities, e.g. waste water from domestic residences and industries. The content of the waste water includes impurities that must be removed to a sufficient degree before the water is released to the recipient. This purification is carried out for instance in municipal cleaning installations where the contaminated water is subjected to a number of purification sub-processes for removing or eliminating the harmful effects of the impurities. The sub-processes include both biological and mechanical processes of treating the contaminated water with or without inactivating microorganisms with UV light.

The impurities may include environmentally harmful substances interfering biologically with the nature, including toxic substances and medical substances, and in particular hormone disruptive substances, such as e.g. dioxins, softeners, phthalates, and oestrogen from contraception pills. These hormonal interfering substances influence both humans, plants and animals and can cause serious genetic disorders. The known cleaning plants and methods do not particularly target these substances when purifying the contaminated water.

From U.S. Pat. No. 4,792,407, an oxidation process is known for reducing the environmentally harmful substances. According to this method, ozone is "bubbled" through the water and a UV low-pressure lamp radiating monochromic light with UV energy of 253 nm wave length is used. It is found that the use of monochromic UV radiation energy with the wave length of 253 nm and with the addition of ozone as bubbles, no creation of $OH^{108}$ radicals and atomic oxygen $O^{3P}$ will occur, as otherwise expected. This known method however is very energy consuming and it has not been possible to achieve the desired results which were expected with respect to the creation of $OH^{108}$ radicals and atomic oxygen $O^{3P}$.

This is due to several factors. The UV low-pressure lamp with monochromic light has 100% intensity by 253.7 nm and the 8% interval is by 184.9 nm. Firstly, this type of lamps is normally intended for inactivating microorganisms and there is hardly any or no energy at all for photochemical fission reactions of the environmentally harmful substances where the required energy most of all is within the range of between 180 nm to 220 nm.

Secondly, the wave lengths required for the photo-oxidation with molecular oxygen must be lower than 200 nm. In order to obtain sufficient energy for the photo-oxidation in water contaminated with environmentally harmful substances, a large amount of UV low-pressure lamps with monochromic light energy must be applied. This is costly and thus not cost-effective for practical use in a large scale in a contaminated water treatment plant.

Thirdly, any possible photo-oxidation, which is generated at a wave length of 184.9 nm, is prevented by using the UV low-pressure lamp, due to reflection from the UV low-pressure lamp of the radiation having other wave lengths, e.g. of 253.7 nm, or by the adjacent lamps if a multiple of lamps are installed prevents the photo-oxidation.

In e.g. U.S. patent application No. 2002/0023866 A1 is described a method of bringing bubbles of ozone in water. From WO97/29997 is known a method of disperging micro bubbles in water.

When ozone is added as bubbles in water and is radiated with monochromic UV light having a wavelength of 253.7 nm, the bubbles absorb the UV energy and oxygen and heat is created without a photo-oxidation is achieved.

The known water purification plants which are used for the oxidation process use a large amount of ozone, hydrogen peroxide and/or other oxidation means relative to the obtained cleaning effect. The reaction time is very long and a large amount of UV lamps with monochromic light must be applied. This results in that this plant is expensive in both installation and operation and the environmentally harmful, hormone affecting, disruptive substances are only partially eliminated if any elimination takes place at all.

SUMMARY OF THE INVENTION

On this background, it is an object of the invention to provide an apparatus and a method of the initially mentioned kind for purifying and eliminating or at least substantially reducing environmentally harmful substances and pharmaceutical residues in contaminated water. Other objects are to deactivate microorganisms and to eliminate or at least substantially reduce the content of contaminating hormonal interfering substances.

This object is achieved by an apparatus of the initially mentioned kind wherein said at least one UV lamp assembly includes a high-pressure UV halogen lamp which is mounted generally parallel with the flow direction in the channel; and by a method whereby the water flow is radiated with UV radiation by at least one UV halogen high-pressure lamp assembly, which is energy intensive wave lengths in the range of 150 nm to 260 nm, preferably in the range of 160 nm to 220 nm, and most preferably in the range of 192 nm to 205 nm.

By using a high-pressure UV halogen lamp, UV radiation for photochemical treatment of contaminated water is provided, wherein the radiation is within the wave length energy range adapted to decomposing hormone disruptive substances. By providing the lamps with their longitudinal direction substantially parallel to the water flow direction, the a number of lamps may be provided in the flow channel without substantially obstructing the water flow.

In the preferred embodiment of the invention, the at least one lamp assembly includes an UV absorber around the lamp. The absorber is tubular allowing the flow of water. The tubular absorber may be rectangular or cylindrical or any other suitable cross-sectional shape. Hereby, it is ensured that one lamp does not radiate light to another lamp or reflects light from another lamp. This ensures a more reliable radiation, as radiations from the lamps do not interfere with radiation from another lamp or a reflected radiation and thereby changing the wave length and thus altering the photochemical treatment of the water. The lamps may preferably be arranged in a cassette or a module which is insertable into the flow channel. The absorber is preferably made of an infrared radiation absorbing material. The absorber also ensures that infrared radiation from the surroundings interfere with the UV radiation of the UV high-pressure halogen lamp. This means that interrupting changes in temperature of the UV halogen high-pressure lamp assembly are avoided. Changes in temperature of the quartz glass of the UV halogen high-pressure lamps may result in a significant reduction in the durability of the lamp, e.g. as little as a few hundred hours.

The absorber may be made of or coated by a radiation protective material preventing decomposing of $OH^{108}$ and preventing the creation of atomic oxygen $O^{3P}$. Apart from shielding against infrared radiation, the absorber also shields the lamp from other lamps. This reduces the creation of $OH^{108}$ and atomic oxygen $O^{3P}$ which otherwise would be created by the radiation energy in the range of 100-220 nm.

The UV absorber may be coated at least on its inner side with an absorber mass, such as e.g. Silicium Carbide SiC, which is a strong absorber of infrared energy, or Titanium oxide $TiO_2$ which can absorb all UV energy below 350 nm in wavelength or an absorber film of Silicium Oxide and Tinanium Oxide $SiO_2$—$TiO_2$. This absorber film will also function as a catalyst for the creation of $OH^{108}$.

The lamp assembly preferably includes means for supplying a dispersion chemical to the water upstream the UV high-pressure lamp. Hereby, the dispersion of the water with oxidation chemicals and/or combinations thereof is added immediately in front of each of the UV lamps by a jet system or the like, so that the pressure is released just before the UV halogen lamp, and a significant more effective use of the oxidation chemicals is obtained resulting in a lower use of chemicals, just as bubbles are avoided. When the oxidation chemicals are not delivered in the form of bubbles, it is no longer necessary to use large reaction containers and/or basins.

Preferably, at least one oxidation chemical is dispersed in the water. The oxidation chemical is preferably oxygen, hydrogen peroxide, ozone, perchloric acetic acid or any combination hereof. The release of the oxidation chemicals is controlled and the pressure and temperature is measured and the dispersed water is released into the water flow in such a manner that the pressure is first released at the outlet and bubbles are prevented from being created in the water around the UV halogen lamp.

The UV high-pressure lamp radiates intensive UV electromagnetic radiation with a high energy with wavelengths in the range of 150 nm to 260 nm, preferably in the range of 160 nm to 220 nm, and most preferably in the range of 192 nm to 205 nm. This results in the achievement of an efficient use of the radiated energy as each lamp is shielded from the other lamps. The UV high-pressure lamp preferably radiates the water with at least 25 $mJ/cm^2$, preferably at least 120 $mJ/cm^2$.

BRIEF DESCRIPTION OF THE DRAWINGS

In the following, the invention is described with reference to an explanatory embodiment shown in the drawings, in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
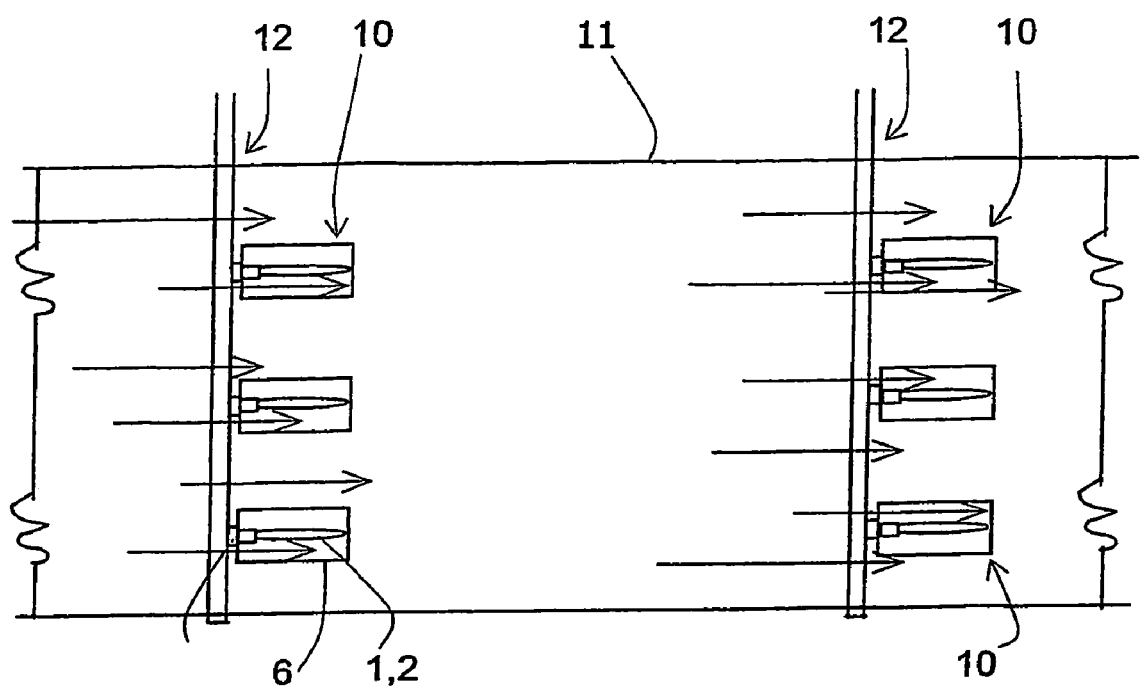
FIG. 1 is a schematic side view of a flow channel with cassettes UV-lamp assemblies provided therein.

In FIG. 1, a flow channel 11 in a water purification system is schematically shown. In the flow channel 11, a number of lamp assemblies 10 are inserted. These lamp assemblies are arranged in an insertable cassette or module 12. The lamp assemblies 10 comprise a halogen UV lamp 1 in a quartz tube 2 and an absorber 6 arranged around the lamp 1 and tube 2. These components are arranged on a lamp housing 3, which is mounted on a module member of the insertable cassette 12. The contaminated water flows as indicated by the arrows in the figure pass the lamp assemblies, i.e. through the tubular absorber 6 and pass the UV lamp 1 in the tube 2.

Figure 2:
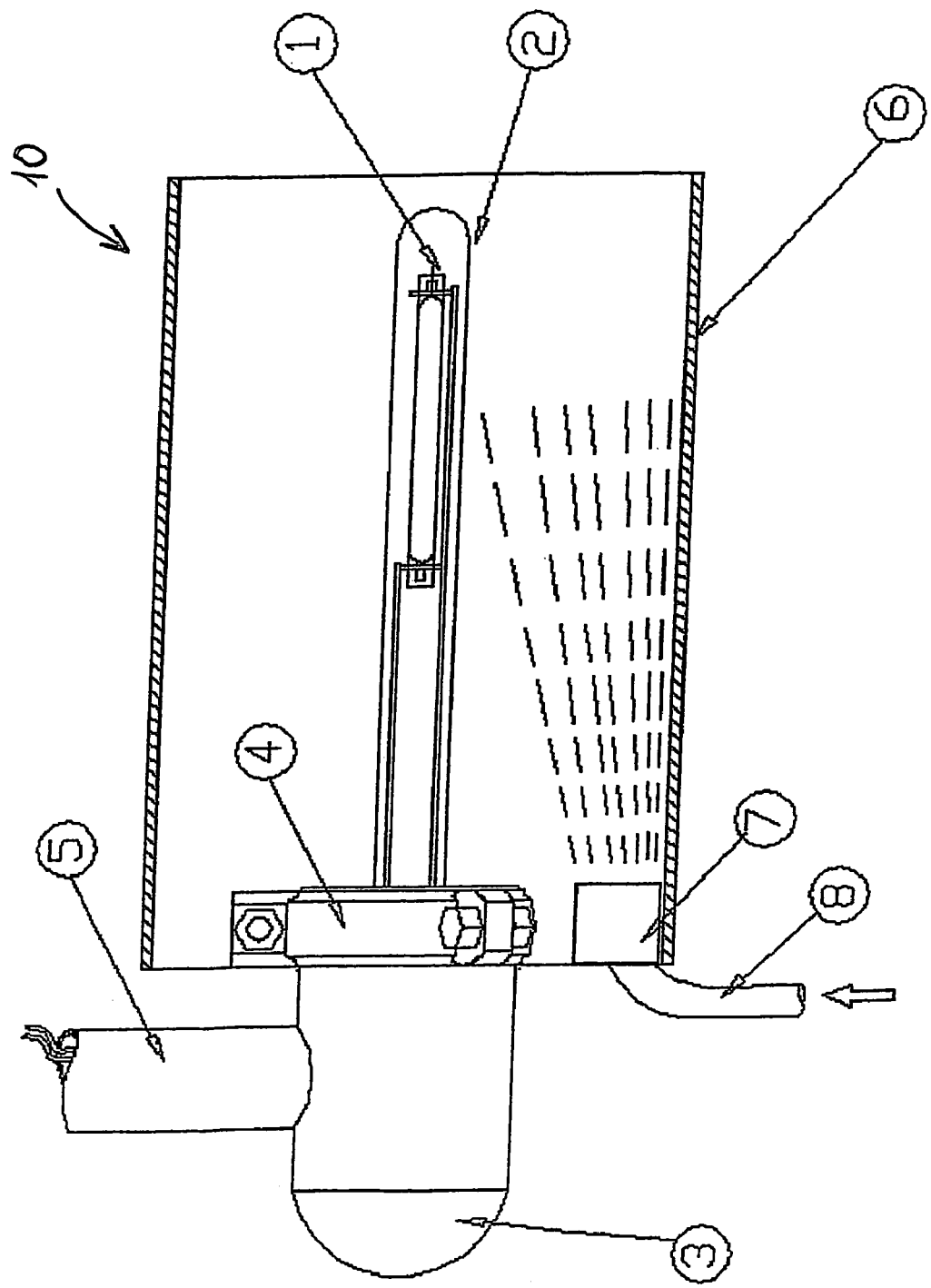
FIG. 2 is a detailed side view of a lamp assembly according to the invention.
Figure 3:
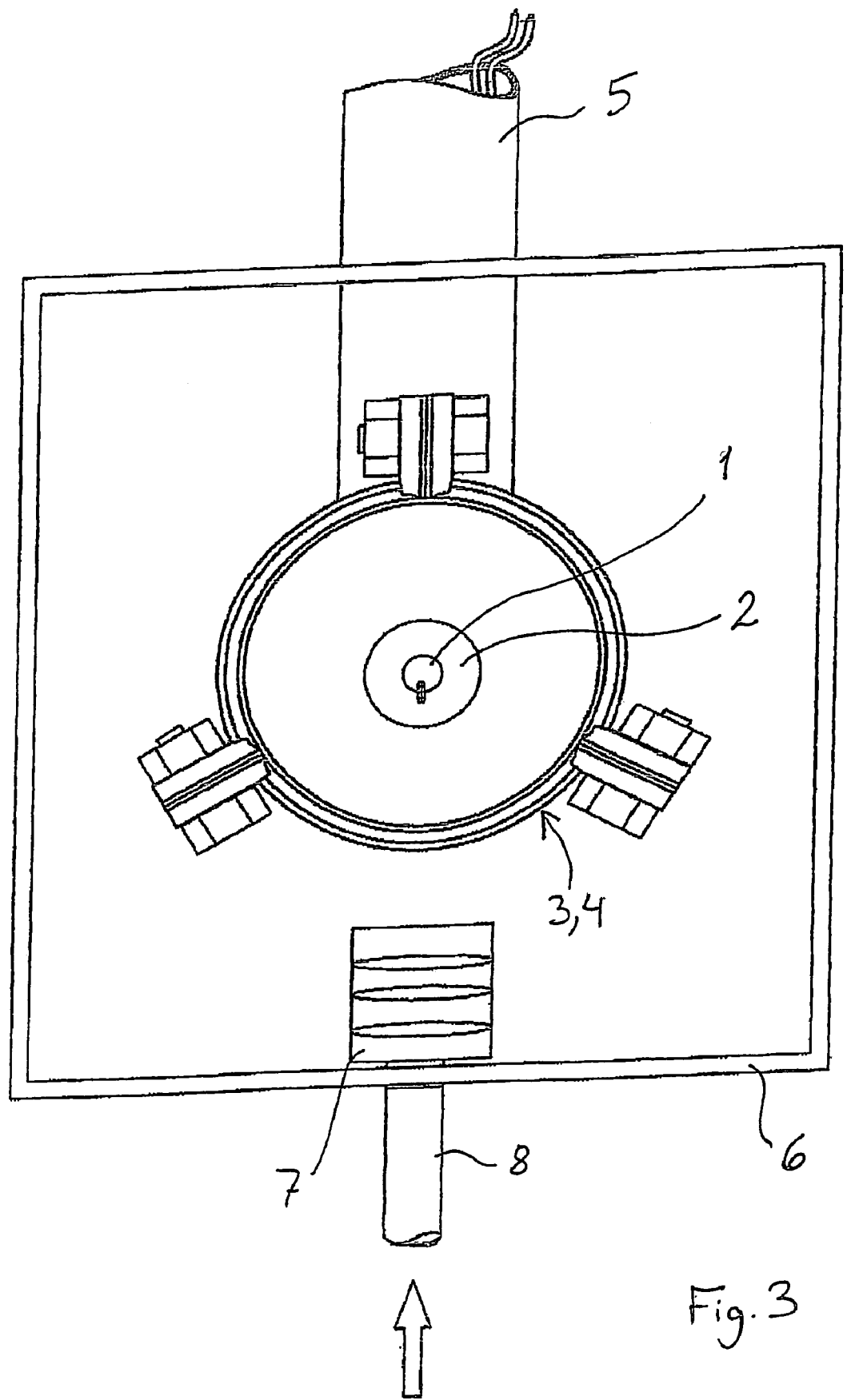
FIG. 3 is a front view of same.

FIG. 2 shows the lamp assembly 10 in more detail. As can be seen in the FIG. 2, the lamp assembly 10 includes a UV halogen high-pressure lamp 1 which is positioned in a quartz stem tube 2, which is mounted on a lamp housing 3. The quartz stem tube 2 is water-tightly clamped or otherwise secured to the lamp housing 3 by clamping means 4. The power supply for the UV halogen high-pressure lamp 1 is established via a connection cable tube 5 in which power cables are provided. The connection cable tube 5 is sealed to the lamp housing 3 so that water is prevented from penetrating into the lamp assembly 10, The connector tube 5 may be integrally formed in the cassette module 12.

Around the UV halogen high-pressure lamp 1, an absorber 6 is provided. The absorber 6 is a tubular member wherein the lamp 1 is shielded from the radiation from other lamps. The absorber 6 absorbs the harmful wavelengths of the radiation which is radiated from the UV halogen high-pressure lamp 1 and which will cause a self-destruction of the UV lamp 1 and prevent the creation of $OH^{108}$ radicals and of atomic oxygen $O^{3P}$. Reflections of radiation or radiations from neighbouring lamps may cause a change in temperature in the UV lamp and alter the energy-rich wavelength range of its radiation. Moreover, the infrared radiation will destroy the lamp as the lamp components will be damaged due to a temperature rise. In an "old" UV-lamp, the infrared energy radiation may be as high as 60% of the radiated energy. Without an absorber 6, this energy could be reflected back to the lamp and cause further destruction of the UV lamp 1, just as radiation from other lamps adds to the degrading of the UV lamp 1 and the quartz stem tube 2.

At the inlet of the absorber 6, a distribution nozzle 7 is arranged. Through this nozzle 7, dispersed water with oxidation means are injected into the water flow inside the absorber 6. The dispersed water including oxidation chemicals is supplied to the nozzle 7 via a supply tube 8.

Above, the invention is described with relation to a preferred embodiment. However, by the invention, it is realised that other embodiments may be carried out without departing from the scope of the invention as defined in the accompanying claims.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. An apparatus for purifying contaminated water by photochemical oxidation, comprising a flow channel through which at least a sub-flow of water is directed and in which the water is irradiated with UV electromagnetic radiation from an array of a plurality of UV lamp assemblies, each of said UV lamp assemblies including a high-pressure UV halogen lamp which is mounted generally parallel with a flow direction in the channel and a tubular UV absorber disposed around each lamp.

2. The apparatus according to claim 1, wherein the absorber is made of an infrared radiation absorbing material.

3. The apparatus according to claim 1, wherein the absorber is made of or coated by a radiation protective material shielding a wave length that decomposes or prevents creation of OH˙ and atomic oxygen $O^{3P}$.

4. The apparatus according to claim 1, wherein the lamp assembly includes means for supplying a dispersion chemical to the water upstream of the UV high-pressure lamp.

5. The apparatus according to claim 4, wherein at least one oxidation chemical is dispersed in the water.

6. The apparatus according to claim 5, wherein said oxidation chemical is oxygen, hydrogen peroxide, ozone, perchloric acetic acid or any combination thereof.

7. The apparatus according to claim 1, wherein the UV high-pressure lamp radiates intensive UV electromagnetic radiation with a wave length in a range of 150 nm to 260 nm.

8. The apparatus according to claim 7, wherein the UV high-pressure lamp radiates intensive UV electromagnetic radiation with the wave length in the range of 160 nm to 220 nm.

9. The apparatus according to claim 8, wherein the UV high-pressure lamp radiates intensive UV electromagnetic radiation with the wave length in the range of 192 nm to 205 nm.

10. The apparatus according to claim 7, wherein the UV high-pressure lamp radiates the water with at least 25 mJ/cm$^2$.

11. The apparatus according to claim 10, wherein the UV high-pressure lamp radiates the water with at least 120 mJ/cm$^2$.

12. The apparatus according to claim 1, wherein the array of lamp assemblies is arranged in a parallel configuration in a cassette module, which is insertable into the flow channel.

13. The apparatus according to claim 1, wherein the tubular absorber is coated at least on an inner side with an absorber mass, such as Silicium Carbide (SiC) or titaniumdioxide (TiO$_2$) or an absorber film of Siliciumdioxide (SiO$_2$) and titaniumdioxide (TiO$_2$).

14. A method of purifying contaminated water by photochemical oxidation, comprising directing at least a sub-flow of water through a flow channel and irradiating the water with UV electromagnetic radiation from an array of UV lamp assemblies each having a UV halogen high-pressure lamp which has energy intensive wave lengths in a range of 150 nm to 260 nm, each of the lamp assemblies including a tubular UV absorber disposed around the lamp that shields the water flow through the lamp assembly.

15. The method according to claim 14, wherein the absorber is made of an infrared radiation absorbing material.

16. The method according to claim 14, wherein the absorber is made of or coated by a radiation protective material that prevents decomposition of OH˙ and prevents creation of atomic oxygen $O^{3P}$.

17. The method according to claim 14, wherein a dispersion chemical is supplied into the water flow upstream of the UV high-pressure lamp in an inlet opening of the tubular absorber.

18. The method according to claim 17, wherein at least one oxidation chemical is dispersed in the water.

19. The method according to claim 18, wherein the oxidation chemical is oxygen, hydrogen peroxide, ozone, perchloric acetic acid or any combination thereof.

20. The method according to claim 14, wherein the UV high-pressure lamp radiates the water with at least 25 mJ/cm$_2$.

21. The method according to claim 14, wherein the UV high-pressure lamp radiates the water with at least 120 mJ/cm$_2$.

22. The method according to claim 14, wherein an array of lamp assemblies is arranged in a parallel configuration in the flow channel in a cassette module, which is inserted into the flow channel.

\* \* \* \* \*